United States Patent
Cottis et al.

[11] 3,975,487
[45] Aug. 17, 1976

[54] PROCESS FOR SPINNING HIGH MODULUS OXYBENZOYL COPOLYESTER FIBERS

[75] Inventors: Steve G. Cottis, Amherst; James Economy, Eggertsville; Luis C. Wohrer, Lewiston, all of N.Y.

[73] Assignee: The Carborundum Company, Niagara Falls, N.Y.

[22] Filed: Aug. 20, 1973

[21] Appl. No.: 389,823

[52] U.S. Cl............ 264/210 F; 260/47 C; 264/290 T
[51] Int. Cl.[2]......................... D01D 5/12
[58] Field of Search........... 260/47 C, 49; 264/210 F, 290 T

[56] References Cited
UNITED STATES PATENTS

| | | | |
|---|---|---|---|
| 2,600,376 | 6/1952 | Caldwell | 260/47 C |
| 3,637,595 | 1/1972 | Cottis et al. | 260/47 C |
| 3,759,870 | 9/1974 | Economy et al. | 260/47 C |

*Primary Examiner*—Jay H. Woo
*Attorney, Agent, or Firm*—David E. Dougherty; Raymond W. Green

[57] ABSTRACT

High modulus oxybenzoyl copolyester fibers are produced by heating to an elevated temperature and stretching oxybenzoyl copolyesters fibers having molecular weights in the range of from 2,000 to 200,000 and melting points of at least 250°C and comprising recurring moieties of Formulas I, II and III -

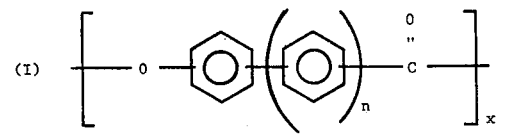

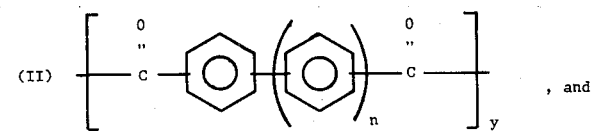

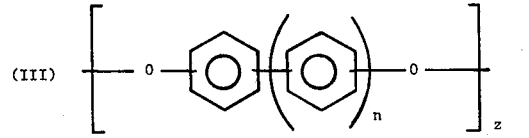

wherein $n$ is 0 or 1; $x$, $y$ and $z$ are integers; $y:z =$ from 10:15 to 15:10, $x:y$ and $x:z =$ from 1:100 to 100:1; $x + y + z =$ from 30 to 600; the carbonyl group of Formula I is meta and/or para to the oxy group thereof; the carbonyl groups of Formula II are meta and/or para to each other; and the oxy atoms of Formula III are meta and/or para to each other; and in more than 50% of the total of sid moieties having said mentioned groups therein they are of para configuration. For Formulas I and II $n$ is preferably 0 and for Formula III it is usually 1.

7 Claims, No Drawings

PROCESS FOR SPINNING HIGH MODULUS OXYBENZOYL COPOLYESTER FIBERS

BACKGROUND OF THE INVENTION

This invention relates to oxybenzoyl copolyester fibers of increased strengths and to methods for the manufacture thereof. More particularly, it relates to essentially linear copolyesters, in fiber form, made from oxybenzoyl, phthaloyl and bisphenoxy moieties which are increased in tensile strength and Young's modulus and are diminished in elongation by heating and stretching. Products made are of strengths equivalent or superior to those of the best of all other synthetic organic polymers known.

Para-oxybenzoyl homopolyesters have been described in U.S. Pat. Nos. 2,600,376; 2,728,747; and 3,039,994 and in an article by Gilkey et al, entitled *Polyesters of Hydroxybenzoic Acids*, appearing in the Journal of Applied Polymer Science, Vol. II, No. 5, pages 198–202 (1959). Improved p-oxybenzoyl homopolyesters have more recently been the subject of French Pat. No. 1,568,152, and applications of such materials and methods for the manufacture thereof have been described in U.S. Pat. Nos. 3,644,593; 3,656,994; 3,662,052; 3,668,300; and 3,669,738. Because of some processing difficulties encountered with the oxybenzoyl homopolyesters, certain copolyesters including oxybenzoyl linkages have been made which are of improved processing properties. For example, the polymers which are described in U.S. Pat. No. 3,637,595 are more easily molded than those of the French patent and are useful for forming into various shapes by known techniques. Thus, they may be employed for producing molded articles, coatings, and fibers and such are described in the patent.

SUMMARY OF THE INVENTION

Fibers from the mentioned copolyesters are sufficiently strong to be useful in many applications but it has now been discovered that fibers of even greater strengths, equal or superior to strengths of any others of the best known synthetic plastic fibers, can be produced by the process of this invention. Thus, when the essentially linear copolymers, such as those described herein and in U.S. Pat. No. 3,637,595, are heated and stretched, products of increased strength are obtained which have comparatively low elongations. Although it is known that the stretching of polymeric filaments may increase the strengths thereof, and stretching at elevated temperature has been practiced, usually it is considered that the increase in strength is due to an increased orientation and crystallization of the polymer accompanying the stretching operation. For example, see U.S. Pat. No. 2,798,283, wherein this result is mentioned. In the present case the stretching is not accompanied by an increase in crystallinity of the polymer, and an increase in strength is unexpectedly obtained despite this.

In accordance with the present invention a method for the manufacture of high modulus oxybenzoyl copolyester fibers comprises: (1) making a fiber from a moldable, film forming polyester having a molecular weight in the range of from 2,000 to 200,000 and a softening point of at least 250°C and comprising recurring moieties of the group of Formulas I, II and III

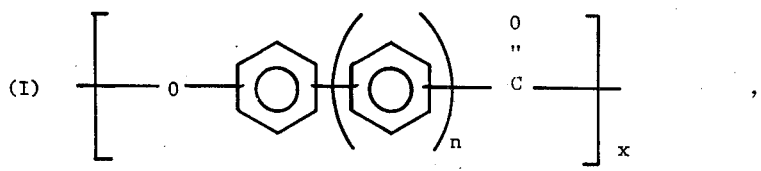

,

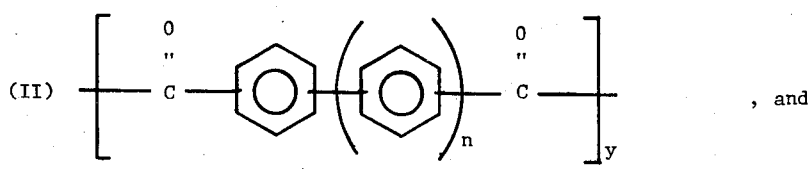

, and

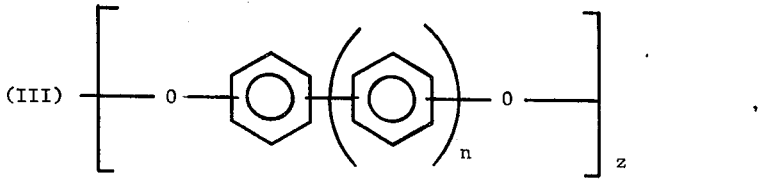

, wherein $n$ is 0 or 1; $x$, $y$ and $z$ are integers; $y:z =$ from 10:15 to 15:10, $x:y$ and $x:z =$ from 1:100 to 100:1; $x + y + z =$ from 30 to 600; the carbonyl group of Formula I is meta and/or para to the oxy group thereof; the carbonyl groups of Formula II are meta and/or para to each other; and the oxy atoms of Formula III are meta and/or para to each other; with more than 50% of the total of said moieties having said mentioned groups therein of para configuration: (2) thereafter heating the fiber to a temperature in the range of from 250°C to 500°c, whereby to cure fiber and fiber (3) stretching the fiber to increase the length thereof from 10 to 400% to increase the tensile strength thereof so that it is in the range of from 100,000 to 1,000,000 lbs/sq in, to increase the Young's modules thereof so that it is in the range of from $4 \times 10^6$ to $3 \times 10^7$ lbs/sq in and to diminish elongation, at room temperature, to from 1 to 10%, preferably from 1 to 5%.

DESCRIPTION OF PREFERRED EMBODIMENTS

The moldable, fiber- and film-forming polyester starting material is essentially linear, normally having at least 50% and preferably at least 75% of para linkages between moieties. The moieties themselves preferably also include such percentages of para configurations, by which it is meant that the functional groups at the ends thereof are normally located para to each other to such extents. Another permissible configuration is meta, but ortho is to be avoided.

As described in U.S. Pat. No. 3,637,595, the moldable oxybenzoyl copolyesters are preferably of Formulas IV, V and III, and the III Formula is preferably (IIIa)

the preferred moiety of Formula III, rather than Formula VI, the preferred moiety of this invention, shown sub-generically and as the preferred species, (VI)

an (VIa)

Although the materials of the patent are useful for making the present fibers, and although the disclosure of U.S. Pat. No. 3,637,595 to Cottis et al for p-Oxybenzoyl copolyesters is incorporated herein by reference, especially for its teaching of oxybenzoyl copolyesters, which have now been found to be usefully converted to fibers, heated and stretched to produce the present polymeric fibers of increased strength, and for manufacturing procedures which are followed in the present invention, some changes are desirably made in the starting materials so as to adapt them to the making of the present superior final products. For example, Formulas I, II and III of this application differ somewhat from their counterparts in the patent. Herein it is preferred to utilize a mixture of terephthalic and isophthalic acids in which the percentage of the isophthalic material is from 10 to 60% and p,p'-bisphenol is a preferred compound of Formula III, rather than hydroquinone. Otherwise, however, the starting mate- (III)

(IV)

(V)

rials of the present process may be considered to be essentially the same.

Exemplary of materials from which the moieties of Formula I may be obtained are p-hydroxybenzoic acid, phenyl-p-hydroxybenzoate, p-acetoxybenzoic acid and isobutyl-p-acetoxybenzoate. Those from which the moiety of Formula II is derivable include terephthalic acid, isophthalic acid, diphenyl terephthalate, diethyl isophthalate, methylethyl terephthalate and the isobutyl half ester of terephthalic acid. Among the compounds from which the moiety of Formula III results are p,p'-bisphenol; p,p'-oxybisphenol; 4,4'-dihydroxybenzophenone; resorcinol; and hydroquinone. Inspection will show which of these materials are also suitable for supplying the moieties of Formulas IV-VI.

Reactions between the various starting materials for the production of the linear copolyester may be effected in manners taught in the U.S. Pat. No. 3,637,595. Thus, random, block or highly ordered copolymers may be synthesized by a wide variety of processes, including simultaneous or sequential reactions of the starting compounds at suitable temperatures, and possibly in the presence of suitable catalysts. The compounds which result in moieties of Formulas of I, II and III can be simultaneously charged to a reaction zone, or alternatively, a source of a moiety of Formula I can be reacted with a similar source of Formula III and the reaction product can be further reacted with a source of Formula II. However, if sequential addition is to be employed it is normally preferable that the I compound is first reacted with a II compound, after which the reaction product may be further reacted with a III compound. Also, I compounds may be reacted with each other first, followed by reaction with a II compound and later the product may be further reacted with a III compound. By such procedure, polyesters having randomly recurring or regularly recurring structural units are produced.

The various condensation reactions will normally be carried out at an elevated temperature, generally from 50° to 400°C. Initial reaction of a p-hydroxybenzoic acid type of material with itself or a dicarbonyl compound of Formula II, or a dihydroxy compound of Formula III, is facilitated by the presence and participation in the reaction of a monoester, preferably a phenyl ester of benzoic acid or a lower alkanoic acid, such as acetic acid. By "lower" is meant from 1 to 6 carbon atoms, preferably 1 to 4 carbon atoms and most preferably 1 to 2 carbon atoms, e.g., acetic. The monoester may join to terminal groups of the hydroxybenzoic acid and will facilitate condensation of such material with itself and with other carboxylic- or hydroxy- terminated compounds, resulting in comparatively low boiling byproducts which are comparatively easily removed from the condensation reaction product. Preferred temperatures for condensation of a hydroxybenzoic acid and a dicarbonyl compound will normally be from 50° to 220°C, preferably from 160° to 200°C. Catalysts for this reaction, which are not necessary but may be advantageously employed, include gaseous acid catalysts such as Lewis acids and hydrogen halides, preferably hydrogen chloride. Condensation reactions of the resulting product with a bisphenol or such type of reactant can be conducted at about 200° to 400°C, preferably at 250° to 350°C. Transesterification catalysts which may be employed in such reactions include sodium alkoxides, titanium alkoxides, such as tetra-n-butyl orthotitanate, sodium titanium alkoxides, lithium hydroxide and p-toluenesulfonic acid. Acetic anhydride is useful as an acetylating agent to convert the hydroxyl groups on the reactive monomers to acetoxy groups and other anhydrides may be employed to produce other lower alkanoyloxy, benzoyloxy and similar groups. These aid in subsequent condensation reactions, helping them to go to completion at lower temperatures and with lower probabilities of degradations of the monomers and polymers. The reactive anhydrides facilitate ultimate condensation and produce readily removable byproducts.

The described reactions can be conducted in the presence of a liquid heat transfer medium having a high boiling point but are preferably carried out in a melt phase. Exemplary of the heat transfer media are the terphenyls, mixtures of polychlorinated polyphenyls such as chlorinated biphenyls typified by those commercially available under the trademark Therminol FR, and polyaromatic ethers and mixtures thereof having boiling ranges which are over 400°C, typical of which is Therminol 77.

The essentially linear polymer made will preferably have a molecular weight in the range of from 3,500 to 100,000 more preferably from 3,500 to 50,000 and most preferably from about 5,000 to 25,000. It will preferably have a softening point or melting point, preferably a melting point, in the range of from 300° to 900°C, more preferably from 350° to 550°C. The sum of $x + y + z$ is preferably from 30 to 250, more preferably from 50 to 200.

Before being extruded or drawn into fibers a molded polymer of the type described may often have a tensile strength of from 5,000 to 20,000 lbs/sq in and a Young's modulus of from 0.1 to $2 \times 10^6$ lbs/sq in. Production of a fiber can be effected either under a nitrogen or air atmosphere, by extrusion at a temperature of from 300° to 600°C or by drawing from a melt at such temperature. Air drawing is usually preferred and often results in a fiber or more greatly improved properties. The rate of fiber production is normally in the range of from 100 to 2,000 ft/minute, preferably from 400 to 1,000 ft/minute. The fibers made will usually be of a thickness of from 0.001 to 2 mm, preferably from 0.01 to 0.10 mm. Fibers treated in accordance with the present invention will be of greater tensile strength and Young's modulus than the compression molded product described; usually such strength and modulus will be in the range of 10,000 to 100,000 and 0.2 to $3 \times 10^6$ lbs/sq in, respectively.

After production of the polymer fiber by a suitable technique from the moldable, film forming copolyester of the desired molecular weight and melting point, the fiber made is heated at an elevated temperature, below (preferably 2° to 30°C below) its melting point for a sufficient period of time to aid in "curing" it, after which it is drawn or stretched so as to increase its length, often to a substantial multiple of the original. The temperature to which heating is effected will usually be over 250°C and is preferably from about 250° to 500°C, more preferably from 280° to 400°C. The time of storage at such temperature is variable and will usually depend in part on the temperature. Although curing can be effected without storage the storage period usually is at least ten minutes at the elevated temperatures, and normally will be over one-half hour. When used, storage periods often are from 1/6 to 48 hours, preferably from 1 to 24 hours and most preferably are about 4 to 20 hours. If heating and stretching are to be effected continuously the period allotted for these and subsequent cooling may be diminished substantially, often to less than a minute, e.g., 10 to 30 seconds. In some cases it may be desirable to initiate the heating at a temperature considerably below the melting point of the fiber and below 250°C, after which the temperature may be gradually increased to the mentioned range. Such a procedure may be followed when the fibers are low melting and/or are in contact with each other and if heated too quickly might tend to fuse at the surfaces thereof and become joined together, causing discontinuities when later separated. For example, heating may be effected at a temperature of 100° to 180°C for a period of from 5 to 24 hours, after which the temperature may be gradually raised, in the early stages at a rate of about 3° to 7°C per hour and later at a rate of from 5° to 20°C per hour until the desired upper limit, below the fusion point of the fiber at that time, is reached. Of course, with the higher melting polymers, which are still susceptible to curing fusion in the temperature range described, gentle curing techniques will not be as advantageous as with lower melting polymers. Also, in the interest of more rapid production gradual heating will usually be avoided unless the advantages compensate for the time lost.

The heating of the fibers may be effected by various known heating means, including radiant and convective heat, with conductive heating techniques usually being avoided. It is preferred to employ convective or forced gas heating since this tends to avoid the production of hot spots in the fibers which could weaken them. The gases employed may be inert or non-reactive gases such as argon and nitrogen and sometimes, carbon dioxide, but generally it has been found to be preferable to employ oxygen-containing gases, such as air, or more preferably, gases higher in oxygen content than air. The oxygen aids in producing a desired crosslinking of the linear polymer, which crosslinking is usually at a minor proportion, less than 50% and often less than 10%, of the available reactive sites at which it might take place. Thus, the polymer molecular weight is increased during the heating operation due to a measure of crosslinking and the strength of the fiber is increased. Instead of utilizing a gaseous oxidizing agent or gaseous crosslinking agent of a suitable type one may apply an oxidizing agent to the surface of the fibers before or during heating or may include it in the gaseous means employed to raise the fiber temperature. Suitable oxidizing agents that may be so employed include the various peroxides, such as hydrogen peroxide, peracetic acid, potassium persulfate and sodium perborate, and in some cases it may be desirable to utilize ozone in the gas. In some instances it will be preferred to avoid the presence of an oxidizing agent because of the intended use of the fibers in applications wherein the greatly increased fiber strength and modulus are not desired or necessary. In such cases a nitrogen or argon atmosphere may be preferable. Even without the oxidant present some useful further polymerization may take place, apparently with crosslinking, increasing the product molecular weight. However, oxygen will usually be in the gaseous medium about the fibers during heating and will be at least 10% thereof, preferably from 20% to 100%. For fastest curing 100% oxygen, which may include from 0.01 to 1% or more ozone, can be used and will be the means for heating the fiber and maintaining it at elevated temperature. Normally, the curing or storage operation is carried out at about approximately atmospheric pressure but higher pressures and vacuums may be utilized, with the absolute pressure generally being in the range of from 1 to 100 lbs/sq in.

During the heating of the fiber it is held on openwork spools or is held, supported or suspended in such manner that the plurality of fibers or single lengths of fiber will not be in contact with other such fibers or portions thereof, or so that any such contact will be minimized. By following such procedure, irregularities in the fibers due to adherences to other filaments or strands during heating will be prevented. Of course, if strands of fibers are to be utilized and such adherences are unobjectionable, pluralities of fibers may be wound together or stored in contact with each other during the heating period.

As a result of the heating and storage operation or equivalent strengthening procedure the molecular weight of the polyester of the fiber, now at least partially crosslinked, will usually be in the range of about 10,000 to 1,000,000, preferably from 100,000 to 500,000. Such fibers have increased tensile strength, Young's moduli, diminished elongations and higher softening points.

After "curing" of the fibers they may be stretched at the elevated curing temperature or a suitable temperature in the range suitable for curing. Normally such temperature will be one within 50°C of the curing temperature, preferably within 20°C thereof. Stretching may be effected in an inert or oxygen-containing atmosphere of the types previously described and in the mentioned pressure range, although stretching in air at atmospheric pressure is preferred. The extent of fiber extension will normally be from about 10% to 400% and usually is from 10% to 100%. The fiber produced by such stretching is preferably at least 20% crystalline, and sometimes its crystallinity is 50% or more. The stretching increases molecular orientation but it does not increase the overall crystallinity of the product. Yet, the strength and Young's modulus increase appreciably. After cooling the stretched fibers have tensile strengths of from 100,000 to 1,000,000 lbs/sq in, preferably in the higher part of this range, Young's moduli in the range of from $4 \times 10^6$ to $3 \times 10^7$ lbs/sq in, also preferably in the higher portion of the range, and elongations, at room temperature, of from 1% to 10%, preferably less than 5% or 6%, such as 1% to 5%. Softening points of from about 400° to 900°C are preferred and usually these will be from about 400° to about 600°C.

Although the properties of the fibers improve with heating or heating and "storage", additional significant improvements in tensile strength, Young's modulus and strain (diminution) result from stretching, such improvements normally being from 5 to 90% of the improvements exhibited by the completely treated fibers.

The preferred temperature range for the stretching operation is from 280° to 320°C, often being from 250° to 350°C, although useful stretching may also occur as high as 400°C, and for some fibers higher or lower temperatures are also practicable, e.g., from 220° to 500°C. The rate of stretching may be 10% of original length per 0.1 second to 10 seconds, and usually higher speed will be preferred, e.g., 100% of length per 0.1 to 10 seconds. During the stretching operation the temperature may be increased, and if the fibers are to be reheated such reheating may be effected, but generally such is not considered to be necessary and the fibers may be stretched at the temperature resulting when they leave the curing area. After the completion of stretching the fibers may be cooled, as by an air blast, to a temperature at which they will be non-adherent, e.g., between 25° and 100°C, and may be wound onto spools or otherwise stored or utilized. Alternatively, they may be wound warm or hot, providing that care is taken to prevent any fusion between the adjacent fibers which might be near their softening or melting points. The fibers produced, despite an absence of increase in crystallinity thereof during the drawing or stretching operations, display greatly increased tensile strengths and Young's moduli and are of satisfactory elongation characteristics. They are useful as fibrous materials or components in high temperature, high strength, corrosion- and reagent-proof applications, such as in fiber wound chemical equipment, pumps, tanks; rocket engine exhaust section support windings; test and analytical instruments; and high temperature fabrics.

Particularly high tensile strengths and moduli have been found to be obtainable by following the invented processes, using copolymers derivable from para-hydroxybenzoic acid, p,p'-bisphenol and mixed terephthalic and isophthalic acids wherein the proportion of terephthalic acid to isophthalic acid is in the range of 2:3 to 9:1. A preferred ratio is from 1:1 to 4:1. With the copolyester made from such material, preferably utilizing the acetic anhydride process of manufacture and with the ratio of p,p'-bisphenol to the total of isophthalic and terephthalic acids being within the range of 0.9 to 1.1, most preferably about 1, while the ratios of para-hydroxybenzoic acid to the bisphenol and the dicarboxylic acids are from 2 to 10, preferably 3 to 5, products of greater strengths and moduli are made. Despite the fact that the formulations described yield hard and relatively high melting polymers, these can be formed into fibers and stretched, although often not to the normal extent of stretching, i.e., sometimes only 10 to 50% stretching will be feasible. The products resulting from such stretching operations have tensile strengths in the 200,000-500,000 lbs/sq in. range and moduli of from $1.5 \times 10^7 - 3 \times 10^7$ lbs/sq in. Even before stretching fibers of the particular formulations within the range of proportions described they yield high moduli and tensile strength products, some of which have moduli as high as $1 \times 10^6$ to $2 \times 10^7$ lbs/sq in. and strengths of from 100,000 to 250,000 lbs/sq in. Improvements are also noted in the elongations of such materials, which are in the 1 to 3% range.

As with the special formulas described herein, very desirable product characteristics can be obtained without stretching, so too, it may be omitted from other processes of this invention, although the desirable properties of most of the formulations mentioned will not be obtained to the same extent without it. Thus, stretching upgrades the properties of some of the copolyesters whose tensile strengths and moduli are too low for demanding applications, and the formula change, as described, results in products of the desired characteristics, which can be further improved by controlled stretching.

Although to obtain the best results it is considered to be most desirable that the mixture of meta and para oriented monomers of the dicarboxylic acid moieties types should be utilized, the desired amount of "resilience" which enables the satisfactory production of fibers and stretching thereof may also be incorporated into copolyesters by utilizing mixed meta and para moieties of the types of Formulas I and III or IV and VI, as well as those of Formulas V and II. About the same proportions of the meta and para constituents are desirable in such cases, too. Similarly, mixtures of different mixed meta-para moieties may be utilized providing that the final ratio of meta-para is within the ranges previously mentioned. Utilization of the described proportions, e.g., 10–90% para and 90–10% meta, preferably with the para predominating in a 40–90% ratio in the present mixtures, in addition to aiding in drawing or spinning of the fibers, also helps to make them stretchable.

The following examples illustrate the invention but do not limit it. Unless otherwise mentioned, all parts are by weight and all temperatures are in 0°C.

EXAMPLE 1

518 parts of isophthalic acid, 1,557 parts of terephthalic acid, 5,175 parts of para-hydroxybenzoic acid, 6,885 parts of acetic anhydride and 2,325 parts of p,p'-bisphenol are mixed together and refluxed for 17 hours, at a temperature of about 180°C, after which the reflux condenser is replaced with a distilling head and the temperature is raised to 345° C over a period of 1 and ¼ hours. The reaction mixture is stirred throughout the heating period, being particularly actively mixed during the period in which the temperature is being raised to 345° C. The yield of polymer is 8,020 parts and 8,010 parts of distillate are recovered. The contents of the reaction vessel are removed, cooled and ground to particle sizes in the 20 to 160 mesh range, U.S. Standard Sieve Series. The resin made is of a molecular weight in the 5,000–20,000 range, with an average weight in about the middle of such range. The product is estimated to be about 50% crystalline.

The resin particles are held under vacuum at an absolute pressure of about 100 mm. of mercury for eight hours and are then melt spun to a fiber by extrusion through a circular orifice having a diameter of about 0.06 mm. at a temperature of 350°–400°C. and a rate of about 200 meters per minute. The filaments so obtained are about 10% more crystalline than before and of about the same molecular weight. They are subsequently held under vacuum for 24 hours at 230°C, with little change in characteristics. However, when they are next raised to 320°C in air, and after a completion of 4 hours of such treatment the molecular weight has increased greatly, to more than 100,000, apparently at least in part due to crosslinking, as well as chain growth. Stretching occurs when such fibers are wound onto reels at about 400°C in air and the extent of stretching is approximately 10%. After cooling the fibers are tested for crystallinity and it is noted that overall crystallinity has not increased due to stretching although molecular orientation appears to be more consistent. In evaluations of the properties of unstretched threads, when averages of ten specimens, having diameters in the range of 0.02–0.05 mm. are taken, it is found that the tensile strength is 95,000 lbs/sq in, the tensile modulus is $7 \times 10^6$ lbs/sq in. and the elongation is 1.6%. After stretching the tensile strength is increased to 213,000 lbs/sq in, the modulus is $14 \times 10^6$ lbs/sq in. and the elongation is 1.3%. Thus, a substantial improvement is noted.

When the same procedure is followed, utilizing hydroquinone instead of p,p'-bisphenol and isophthalic acid in place of the mixture of isophthalic and terephthalic acids, stretching 100%, from an initial diameter of one mm. to about 0.7 mm. increases the tensile strength significantly, over 20%, but the final product is not of as high a tensile strength of modulus as that previously described herein. Similarly, when stretching is effected at lower temperatures, e.g., 320°C, improved strength and modulus are obtained, compared to controls, and such improvements are increased when before stretching the fibers or threads are heat cured in the presence of air at an elevated temperature, e.g., 300°C, for from 1 hour to 4 hours.

EXAMPLE 2

A mixture of 104 parts of isophthalic acid, 104 parts of terephthalic acid, 518 parts of para-hydroxybenzoic acid, 689 parts of acetic anhydride and 233 parts of p,p'-bisphenol is charged to a reaction vessel and is refluxed for 16 hours at 200°C, after which the reflux condenser is removed a distilling head is installed on the reaction vessel and the temperature is raised to 345°C over a period of 1.5 hours. Over 500 parts of distillate are removed and the yield of product is 818 parts, which is dumped as soon as the temperature of 345°C is reached. The product is ground to the same size range as that of the product of Example 1.

The particulate resin is heated at a temperature of 325°C and is drawn into fibers having diameters of from 0.03 to 0.07 mm. which are then tested for physical characteristics. The resins are prepared, cured and aged in the same manner as described in Example 1. However, the drawing temperature is lower and the stretching temperature is about 375°C. After 5-second stretching to about 20% the average tensile strength is 152,000 lbs/sq in. and the average modulus is $10.6 \times 10^6$ lbs/sq in, both of which are substantial improvements over the readings for the unstretched fibers.

In a variation of this experiment, the terephthalic acid constituent is replaced with additional isophthalic acid and it is noted that the average modulus after stretching is less than 60% of that with the terephthalic acid content.

EXAMPLE 3

A charge of 483 grams (3.5 moles) of p-hydroxybenzoic acid, 325 grams (1.75 moles) of p,p'-bisphenol, 291 grams (1.75 moles) of a mixture of 75% of terephthalic acid and 25% isophthalic acid and 755 grams (7.4 moles) of acetic anhydride is heated to a temperature of 140°C and is refluxed at such temperature for 18 hours, after which the reflux column is replaced by a distilling column and the reaction mixture is heated to 330°C with good thermal insulation around the resin kettle, over a period of 2 hours. Acetic acid (861 grams) is distilled off from the resin kettle during this period. The contents of the flask are removed therefrom, cooled to room temperature and ground to a particle size in the 20-160 mesh range, U.S. Standard Sieve Series. The yield obtained is 952 grams, which is approximately a stoichiometric yield. The resin made has a molecular weight of about 10,000 and is 65% crystalline.

The particulate resin is melt spun into a fiber by extruding it through a circular orifice of a diameter of one millimeter at a temperature of about 320°C and a rate of 200 meters per minute. The filaments so obtained are about 70% crystalline and of about the same molecular weight as before. They are then exposed to a heat treatment in air wherein hot air at a temperature of 280°C is blown across the fibers as they are hanging in non-contacting relationship. The heat treatment lasts for 3 hours, after which the fiber temperature is raised to 315°C and the fibers are stretched about 210% during a period of about ten seconds. They are then cooled and are examined and tested. It is found that although the molecular orientation has increased, the crystallinity of the product is somewhat less than before stretching. Also, the fibers made have a tensile strength of 150,000 (average) to 205,000 (maximum) lbs/sq in, a Young's modulus of $5.0 \times 10^6$ (average) to $6.5 \times 10^6$ (maximum) lbs/sq in. and a elongation, at room temperature, of 4.9%. The melting point of the fibers is over 350°C. When unstretched the modulus is about $3 \times 10^6$ lbs/sq in.

The product iso made is useful as a fiber for the manufacture of cloths for high temperature applications, e.g., special exhaust pipe wrappings, high temperature tank coverings, temperature resistant clothing, bearing parts and insulation wrappings, etc.

When the operation is repeated, utilizing oxygen enriched air, the equivalent heat treatment takes only about ten minutes. Similar treatments, carried out with the other copolyester resins of U.S. Pat. No. 2,637,595 and other oxidizing agents previously recited, produce comparable effects. When no oxidizing agent is present during the heating operation, as when nitrogen gas is the heating means, an improvement in strength of the fiber is obtained but it is noticeably less than in the above example. Also, when temperatures are varied within the ranges given and stretching limits are changed but are kept within those ranges, useful improved products also result. Such results are considered to be unexpected in view of the decreased crystallinity of the product after the treatment of the invention. See U.S. Pat. No. 2,798,283.

EXAMPLE 4

A procedure very much like that of Example 3 is followed except for the sequential reactions of monomers rather than conjoint reactions. Thus, 483 grams of p-hydroxybenzoic acid, 325 grams of p,p'-bisphenol and 755 grams of acetic anhydride are refluxed for 16 hours at 143°C, after which a distilling column replaces the reflux column and the mixture is heated to 168°C over a 2 hour period. At the end of such period 267 grams of acetic acid have been recovered as distillate. Then, 291 grams of a 70:30 mixture of terephthalic and isophthalic acids are added and the mixture is heated to 330°C over a period of 2 hours, with good thermal insulation around the resin kettle. An additional 590 grams of acetic acid are recovered by distillation during this period. Next, the resin contents of the flask are dumped into a stainless steel tray, in which they are cooled to about room temperature. The resin is then ground to a powder with particle sizes in the 20–160 mesh range, U.S. Standard Sieve Series. The yield is 975 grams, approximately stoichiometric. The resin made has a molecular weight of about 10,000 and is about 70% crystalline.

The particulate resin is melt spun into a fiber by extruding it through a one millimeter diameter circular orifice at a temperature of 320°C at a rate of about 200 meters per minute. The filaments obtained are about 70% crystalline and of about the same molecular weight as before. They are next exposed to a heat treatment in air, with air at a temperature of 320°C being blown across the fibers as they are supported in non-contacting relationship with each other. The heat treatment lasts for two hours, after which the fiber temperature is held at 320°C and the fibers are stretched about 220% during a period of about ten seconds. They are then cooled and are examined and tested. It is found that although the molecular orientation has increased, the crystallinity of the product is somewhat less than before stretching, being about 60%. Also, the fibers made have a tensile strength of about 180,000 lbs/sq in, Young's modulus of about $6 \times 10^6$ lbs/sq in and an elongation, at room temperature, of about 4%. The melting point of the fibers is about 370°C.

The product has applications like those of that of Example 3 except that the higher melting point and greater stregths make it even more desirably employed in such and more demanding applications.

When the operation is repeated, utilizing a mixture of 50 parts of oxygen and 50 parts of nitrogen, equivalent heat treatment takes only about 10 minutes and with ozone present to the extent mentioned in Example 3 the time of heat treatment may be dropped to three minutes or less. Similar sequential copolymerizations utilizing the other copolyester resin constituents of U.S. Pat. No. 3,637,595 and the oxidizing agents previously recited produce comparable effects. This is also true when the temperatures are varied within the ranges previously given and when the stretching limits are changed but are kept within those ranges.

The products made by the methods of the foregoing examples have high stiffness, thermal conductivity, electrical insulating properties and solvent resistance, attributable, it appears, to their contents of polyoxybenzoyl or oxybenzoyl moieties. However, because of their copolyester nature they have melting points, are moldable and may be drawn into fibers, whereas the polyoxybenzoyl products of comparable molecular weights and desirable end use properties do not have melting points and are not readily convertible to fiber form.

The invention has been described with respect to illustrations and exemplifications thereof but is not to be considered as limited to these inasmuch as one of skill in the art, with the present disclosure before him, will be able to utilize substitutes and equivalents without departing from the scope and spirit of the invention.

What is claimed is:

1. A method for the manufacture of high modulus oxybenzoyl copolyester fibers which comprises: (1) making a fiber from a moldable, film forming polyester having a molecular weight in the range of from 2,000-200,000 and a melting point of at least 250°C and comprising recurring moieties of the group of Formulas I, II and III -

(I) 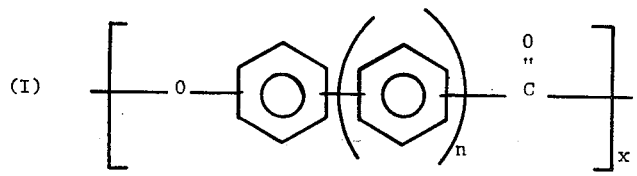, (II) 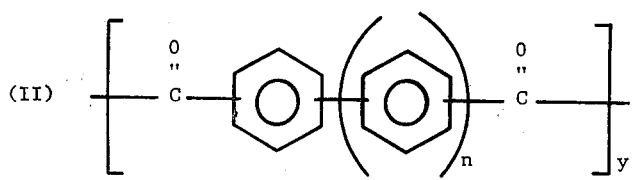, and (III) 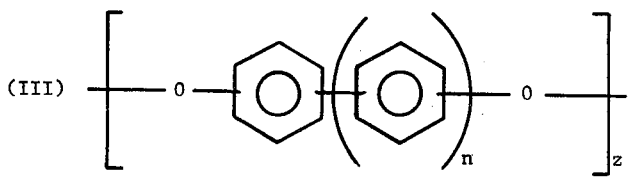, wherein $n$ is 0 or 1; $x$, $y$ and $z$ are integers; $y:z =$ from 10:15 to 15:10, $x:y$ and $X:z =$ from 1:100 to 100:1; $x + y + z =$ from 30 to 600; and the carbonyl group of Formula I is meta and/or para to the oxy group thereof; the carbonyl groups of Formula II are meta and/or para to each other; and the oxy atoms of Formula III are meta and/or para to each other; with more than 50% of the total of said moieties having said mentioned groups thereof of para configuration; (2) thereafter heating the fiber to a temperature in the range of from about 250° to about 500°C whereby to cure the fiber and (3) stretching the fiber to increase the length thereof from about 10% to about 400% to increase the tensile strength and Young's modulus.

2. A method according to claim 1 wherein the fiber is heated in the presence of an oxidizing agent for at least ten minutes and thereafter stretched to obtain a tensile strength in the range of from 100,000 to 1,000,000 lbs/sq in. and a Young's modulus in the range of from $4 \times 10^6$ to $3 \times 10^7$ lbs/sq in.

3. A method according to claim 2 wherein the polymer of the fiber which is heated in the presence of oxidizing agent and is thereafter stretched has a molecular weight in the range of 100,000 to 500,000 and comprises partially crosslinked recurring moieties of Formulas I, II and III wherein n is 0 for Formulas I and III and 1 for Formula II, and the carbonyl and oxy groups of the moiety of Formula I are para to each other, the oxidizing agent in the presence of which the fiber is heated is gaseous and contains at least about 20% oxygen, and the heating time is from ten minutes to 48 hours.

4. A method according to claim 3 wherein $x + y + z$ = from 30 to 250 so that the molecular weight of the polymer before heating, curing and stretching is from 3,500 to 50,000; the gaseous oxidizing agent is from about 20% to 100% oxygen, with the balance being an inert gas and/or nitrogen; the heating time is from 1 to 24 hours and stretching of the fiber takes place at a temperature in the range of 250° to 350°C until the fiber has increased in length from 10% to 400%.

5. A method according to claim 4 wherein the recurring moieties are joined together so as to be essentially linear in configuration, prior to curing, with more than 75% of the bonds between them in para configuration and with the stretched fiber produced being at least 20% crystalline.

6. A method according to claim 4 wherein the oxybenzoyl copolyester fiber to be heated and stretched consists essentially of recurring moieties of Formulas IV, V and VI (IV) 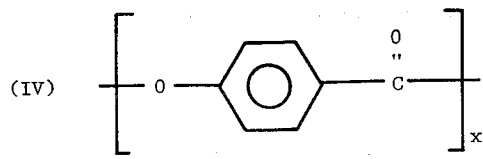

(V) 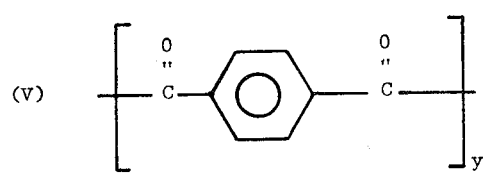 , and (VI) 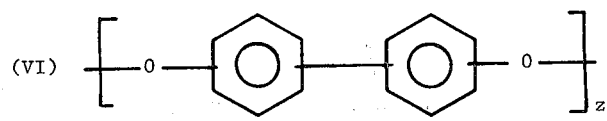 , wherein the moieties of Formulas IV and VI are of essentially para configuration and that of Formula V is from 40% to 90% of para and 60% to 10% meta configuration.

7. A method according to claim 6 wherein the temperature to which the fiber is heated is from 280° to 400°C, heating is effected by circulating heated air or oxygen in contact with the plurality of fibers or single length of fiber held so that contact is avoided between the fibers, and stretching is effected at a temperature within 50°C of the heating temperature.

* * * * *